Figure 2:
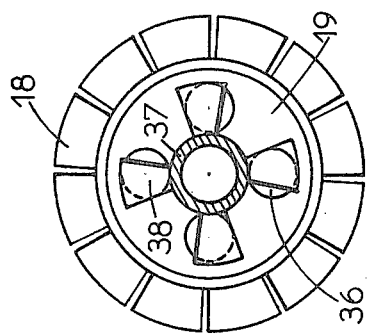

United States Patent [19]

Coninx et al.

[11] 3,999,432
[45] Dec. 28, 1976

[54] FLOWMETER

[75] Inventors: Marcel Coninx, Boulogne; Robert Ducousset, Clamart, both of France

[73] Assignee: Compteurs Schlumberger, Montrouge, France

[22] Filed: Aug. 21, 1975

[21] Appl. No.: 606,684

[30] Foreign Application Priority Data

Aug. 23, 1974 France ............................ 74.28921

[52] U.S. Cl. ............................................. 73/231 R
[51] Int. Cl.² ........................................... G01F 1/12
[58] Field of Search ............. 73/231; 415/104, 106

[56] References Cited

UNITED STATES PATENTS

| 3,388,595 | 6/1968 | Last et al. ............................. 73/231 |
| 3,518,881 | 7/1970 | Erickson ............................... 73/231 |
| 3,756,079 | 9/1973 | November ............................. 73/231 |
| 3,811,323 | 5/1974 | Swenson ............................... 73/231 |

*Primary Examiner*—Herbert Goldstein
*Attorney, Agent, or Firm*—William R. Sherman; Stewart F. Moore; Kevin McMahon

[57] ABSTRACT

A flowmeter comprises an axial flow measurement turbine having a relatively thin turbine disc secured to a shaft which is supported on at least one axial bearing. At high flow rates, it is possible for a large pressure differential to build up between the opposite axial sides of the disc, subjecting the turbine to an axial force which results in excessive friction at the bearing and therefore reduced life and reduced accuracy. To solve this problem, the disc is provided with apertures passing axially therethrough, and a set of blades is secured to the upstream face of the disc to force fluid to flow through these apertures, and thus substantially eliminate the pressure differential.

11 Claims, 2 Drawing Figures

FLOWMETER

The present invention concerns flowmeters and more particularly turbine flowmeters comprising a reactive turbine mounted on a shaft coaxial with a flow turbine.

Such a turbine is subjected to a couple which is a function of the speed of flow and, therefore, for a pseudo-stationary regime a function of the volume of fluid passing through the blading of the turbine.

The metrological quality of a turbine flowmeter is judged from a calibration curve giving the relative deviation of the number of revolutions per unit time between a production flowmeter and a standard flowmeter as a function of volumetric flow; this calibration curve must be somewhere in the norm comprised between two error limits.

The errors for low volumetric regimes are generally inherent in various frictional effects and in the inertia of the rotational apparatus and of the devices for transmitting the rotation.

On the other hand, for high volumetric regimes, the speeds of flow induce different static pressures on both sides of the measuring turbine and this pressure difference produces an axial force which not only produces prohibitive frictional effects, but combines to reduce the duration of the life of the rotational apparatus and its bearings.

The majority of known devices take account of the modification of the calibration curve due to this axial force and restrict themselves to flattening the maximum of the curve for low regimes in order to channel the useful part of this curve into a margin of error conforming to the norm, but to the detriment of the sensitivity of the flowmeter apparatus.

Other known apparatuses partially remedy this pressure difference on both sides of the measuring turbine by arranging at least one conduit establishing communication between the downstream and upstream faces of said turbine. But such apparatuses are limited in range of flows, since for high speeds of rotation a masking effect is produced which completely inhibits the function of the conduits of communication.

The present invention has for its object to palliate these disadvantages.

The present invention also has for its object to provide a turbine flowmeter of great sensitivity and having a significant duration of life for a very large range of flows.

The subject of the present invention is a flowmeter comprising an axial measuring turbine consisting of a hub carrying a row of blades on its periphery and mounted on a first shaft, said shaft being supported and maintained on at least one axial bearing, means for securing said axial bearing to a cylindrical housing coaxial with said first shaft, a hollow fairing coaxial with said first shaft producing in the interior of the cylindrical housing an annular conduit of continuously variable profile for guiding a fluid towards the annular section of the row of blades of the measurement turbine, means for securing said fairing to said cylindrical housing, a gear member cooperating with one end of said first shaft for transmitting, by the intermediary of a second shaft of which the axis is substantially perpendicular to the axis of said first shaft, the rotation of said measuring turbine to a totalisating counter fixed on said housing, the hub of said measuring turbine comprising apertures passing through it in the axial sense, characterised by the fact that said hub comprises means for forcing a circulation of fluid through these said apertures.

Figure 1:
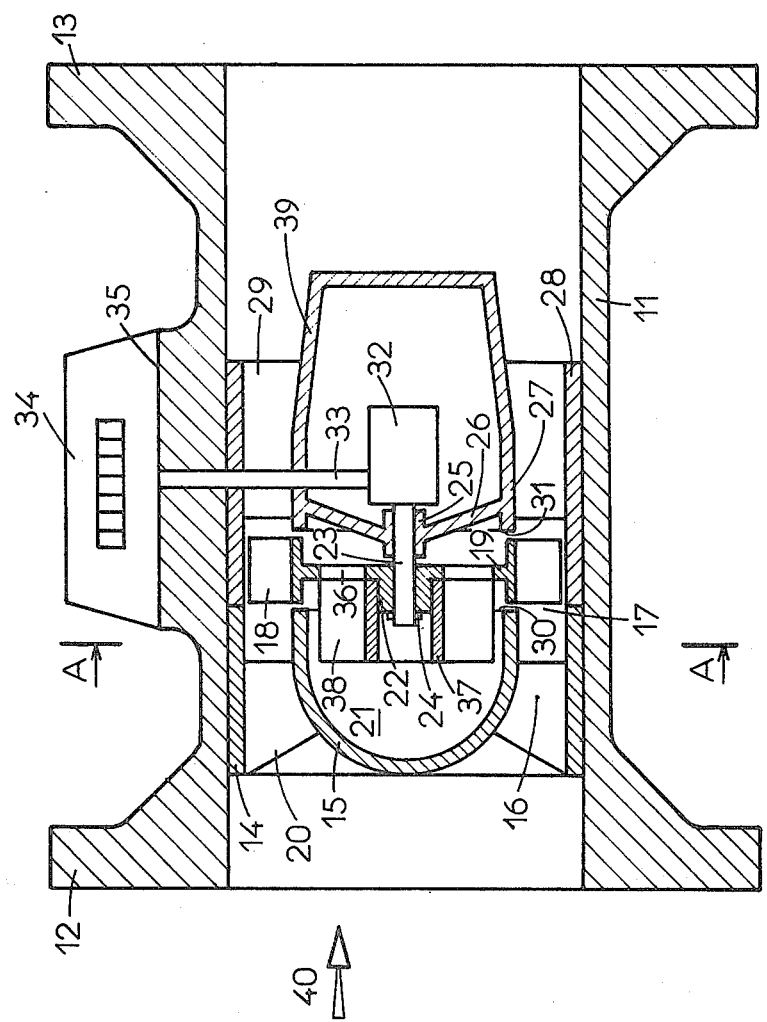

Other characteristics and advantages of the present invention will be apparent from the following description given with reference to the attached drawings, of which:

FIG. 1 shows a scheme of an implementation of a flowmeter according to the invention viewed in longitudinal section, FIG. 2 shows a view in axial section along the section AA of the same flowmeter according to the invention.

The axial flowmeter illustrated in FIGS. 1 and 2 comprises a tubular body 11 forming a housing and supplied with means 12 and 13 for coupling said housing to a fluid circulation circuit (not shown) of which the direction of circulation is that of the arrow 40. In the bore of this tubular body is fitted a first sleeve 14 which delimits with a coaxial fairing 15 a circular channel 16 of continuously convergent profile up to a measuring annulus 17 in which is positioned a row of radial blades 18 secured to a hub of thin material 19. The coaxial fairing 15 is maintained in place by ribs 20 which secure it to the first sleeve 14. This fairing is of the thin-shelled type and forms an interior cavity 21 of which the largest diameter is just smaller than the diameter at the roots of the blades of the row of radial blade 18. The hub of thin material 19 is enlarged in the region of its axis of revolution to form a hollow shaft 22 which is secured to one overhung end of a first shaft 23 by fixing means 24. This shaft 23 is positioned in a bearing 25. This bearing is formed in a radial partition 26 which opens out in the radial sense towards larger diameters to form a cylindrical sleeve 27 of which the external diameter is substantially equal to that of the roots of the blades of the row of blades 18. This cylindrical sleeve 27 is secured to a second sleeve 28, fitted in the housing 11, by ribs such as 29. The axial turbine constituted by the hub 19 secured to the shaft 23 and provided with blades 18 is thus axially positioned with a small amount of play between two planes 30 and 31 constituted respectively by the downstream section of the fairing 15 and the upstream section of the cylindrical sleeve 27.

The first shaft 23 passes through the bearing 25 and its downstream end drives a transmission member 32 which transmits its rotation to a second shaft 33 of which the axis is substantially perpendicular to the common axis of the housing and the first shaft. The second shaft 33 controls a totalisating counter 34 positioned on a flat part 35 of the housing 11. The transmission mechanism 32 is isolated from the fluid circuit by a cover 39 integral with the cylindrical sleeve 27 and of which the evolutive profile in the axial sense ensures a continuously divergent conduit between the measurement annulus and the downstream circuit of distribution.

In the disc of the hub 19 are arranged apertures 36 which traverse it from one side to the other in the axial sense. On the upstream face of the hub 19 is fixed a ring 37. On this ring are positioned radial blades 38 of which the number is the same as that of the apertures 36. These blades, which together may comprise an axial screw, have an external diameter just less than the internal diameter of the cavity 21 and are disposed in such a manner that the trailing edges come substantially into contact with the largest dimension of the aperture 36.

It is known that for high flow rates the speed of flow of the fluid to be measured induces static pressure differences on both sides of the disc of the hub 19 of the measuring turbine and that the resulting axial force is detrimental as much to the duration of the life of the rotating equipment as to the precision of the measurement of the flow, which is affected by the restraints which this force exerts on the bearing 25. At low flows the apertures 36, which permit the static pressures to balance on both sides of the hub 19, are satisfactory. On the other hand, for large flows and large speeds of rotation of the measurement turbine, they prove inoperative. In this case, the blades 38 then force a circulation of the 'dead' fluid prevailing on both sides of the hub of the turbine so as to balance the pressures and to practically cancel the axial force on the bearing 25 regardless of the flow rate.

The great flexibility of the apparatus according to the invention permits the adjustment of this axial force at will, according to the ranges of operations foreseen for the flowmeter. Further, this flowmeter guarantees a high accuracy for a large range of flows and a substantial duration of life.

What is claimed is:

1. A flowmeter of fluid comprising an axial measurement turbine consisting of a hub carrying a row of main blades on its periphery and mounted on a shaft, said shaft being supported on at least one axial bearing, means for securing said axial bearing to a cylindrical housing coaxial and said first shaft, a hollow fairing coaxial with said first shaft forming in the interior of said cylindrical housing an annular conduit of continuously variable profile for guiding the fluid towards the annular section of the row of main blades of the measurement turbine, means for securing said fairing to said cylindrical housing, means for counting the number of revolutions of said turbine, at least an aperture formed in said hub and putting in communication the upstream and downstream sides of said turbine, and means for forcing a circulation of the fluid through said aperture from the upstream side thereof towards the downstream side thereof.

2. A flowmeter according to claim 1, wherein said means for forcing a circulation of fluid through said aperture comprises at least a radial secondary blade secured to the hub substantially in regard of the said aperture.

3. A flowmeter according to claim 1, wherein said means for forcing a circulation of fluid comprises an axial screw secured on the shaft of the hub substantially in regard of said aperture, the external diameter of said axial screw being less than the internal diameter of said upstream fairing.

4. A flowmeter according to claim 2, wherein said radial secondary blade is arranged inside the periphery of said hub, the fairing of said radial secondary blade being the base sleeve of the main blades of said measurement turbine.

5. In a flowmeter for measuring the flow rate of a fluid stream, the flowmeter including a cylindrical housing; a measurement turbine rotatably mounted in said housing and including a hub having a plurality of blades on its periphery; a hollow fairing mounted in said housing and forming therein an annular conduit of variable profile for guiding the fluid toward the blades of said turbine; and means for counting revolutions of said turbine; the improvement comprising:
 a plurality of apertures in said hub forming communicating passages between the upstream and downstream sides of said turbine; and
 auxiliary blade means for forcing circulation of the fluid through said apertures.

6. The flowmeter as defined by claim 5 wherein said auxiliary blade means comprises a plurality of auxiliary blades disposed in the flow path of said apertures.

7. The flowmeter as defined by claim 6 wherein an auxiliary blade is provided for each aperture.

8. The flowmeter as defined by claim 5 wherein said auxiliary blade means is coupled to said hub such that said auxiliary blade means rotates in unison with said turbine.

9. The flowmeter as defined by claim 6 wherein said auxiliary blade means is coupled to said hub such that said auxiliary blade means rotates in unison with said turbine.

10. The flowmeter as defined by claim 6 wherein the outer dimension of said auxiliary blades is less than the internal diameter of said upstream fairing.

11. The flowmeter as defined by claim 9 wherein the outer dimension of said auxiliary blades is less than the internal diameter of said upstream fairing.

* * * * *

UNITED STATES PATENT OFFICE
CERTIFICATE OF CORRECTION

Patent No. 3,999,432      Dated December 28, 1976

Inventor(s) Marcel Coninx and Robert Ducousset

It is certified that error appears in the above-identified patent and that said Letters Patent are hereby corrected as shown below:

Column 2, line 13 after "axial" insert -- turbine --.

Claim 1, line 30 after "coaxial" delete "and" and insert therefor -- with --.

Signed and Sealed this

*Twenty-second* Day of *January 1980*

[SEAL]

*Attest:*

*Attesting Officer*

SIDNEY A. DIAMOND

*Commissioner of Patents and Trademarks*